UNITED STATES PATENT OFFICE.

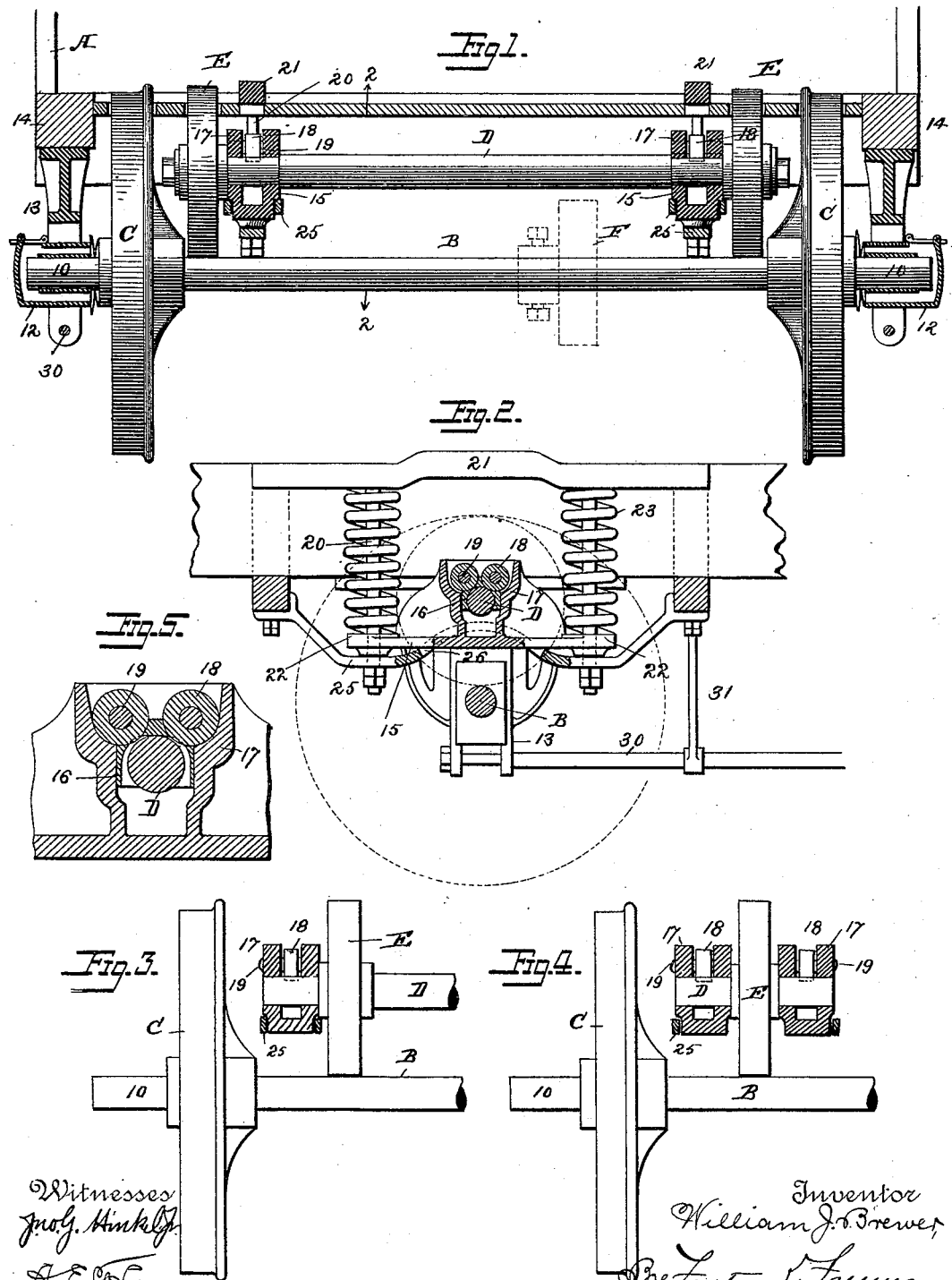

WILLIAM JOHN BREWER, OF NEW YORK, N. Y.

ANTI-FRICTION BEARING.

SPECIFICATION forming part of Letters Patent No. 437,561, dated September 30, 1890.

Application filed July 3, 1888. Serial No. 278,899. (No model.)

*To all whom it may concern:*

Be it known that I, WILLIAM JOHN BREWER, a subject of the Queen of England and having declared an intention of becoming a citizen of the United States, residing in the city, county, and State of New York, have invented certain new and useful Improvements in Anti-Friction Bearings, fully set forth in the following specification, and represented in the accompanying drawings.

The present invention relates to that class of bearings usually called "anti-friction bearings," wherein rollers or wheels are provided to sustain the load, thereby materially reducing the friction and wear upon the running-parts; and it consists in certain novel features and combinations of parts fully hereinafter set forth.

The improvements are best illustrated in connection with a vehicle, car, or other similar structure adapted to either travel over ordinary roads or upon a suitable track or way, wherein—

Figure 1 is a cross-sectional elevation of a portion of a vehicle provided with the invention. Fig. 2 is a longitudinal sectional elevation of the same, taken on the line 2 2 of Fig. 1. Figs. 3 and 4 are sectional views illustrating modified forms of the manner of journaling the anti-friction axle, and Fig. 5 is an enlarged view of part of Fig. 2.

The invention is particularly adapted to those vehicles which, in addition to the usual load, are provided with a motor for propelling them along the road or way—such, for instance, as electric, steam, or gas motors—and also those carrying a gripping mechanism for use in connection with a traveling cable; and in the present embodiment thereof the entire weight or load is sustained by the axle or axles of the anti-friction lever-wheels, thus reducing the friction upon the main axles and wheels, allowing them free scope for work, and materially reducing the wear and tear thereupon.

Referring to said drawings, so far as shown, A is a vehicle of any of the usual constructions, that taken for illustration being an ordinary tram-car provided with the usual axle B and track-wheels C, secured thereto. The ordinary journals 10 of the axle each extend into the slot of a bracket or pedestal 13, that is secured to the under side of the car-sill 14, so as to be free to play vertically in said slot, the lower end of the latter being stopped by a bar or rod to prevent the axle and wheel from becoming disconnected from the vehicle. In the preferred form, however, the journals 10 are each seated in bearings in an axle-box 12, that is held in the slot and adapted to play vertically therein.

Between the load represented by the vehicle A and the main axle B there is interposed a second or anti-friction axle D, supporting at its opposite ends an anti-friction or lever wheel or roll E, secured to said axle, and which is adapted to bear against and run in contact with the main axle B. The axle D is mounted vertically over the main axle B in bearings provided by a pair of brackets 15, sustained from the under side of the vehicle platform or floor and between the track-wheels in such a manner that the lever-wheels E may bear upon said axle B and in close proximity with its track-wheels C, so that the load is transferred to the track-wheels as nearly vertically over their treads as is possible. This construction permits the ordinary running-gear of a tram-car to be readily provided with the anti-friction axle and wheels, so that little or no alteration is required in said gear.

The journals of the axle D bear against brasses 16, secured in suitable housings 17, provided on the brackets 15, which brasses ordinarily transfer the load to the said axle. The brasses are each supplemented by a pair of anti-friction rolls 18, mounted on shafts 19, supported in the housings 17 upon opposite sides of the vertical axis of the axle D, the bearing-faces of which rolls project through recesses in the brasses, so that the axle D may bear against and run in contact therewith. The arrangement of these independent rolls 18 with respect to the axle D is such that when the vehicle is traveling on a level they do not bear upon the axle, but when it is ascending or descending a grade the load will be transferred to the said axle wholly by one of the rolls, thus removing the friction for the time being of the entire or major portion of the brasses. The brackets 15 are held in place by rods 20, depending from the vehicle-body and preferably from a longitudinally-arranged bar 21, with which the vehicle is provided.

Instead of employing the usual springs in connection with the main axle, the vehicle is supported upon the brackets 15 through the medium of springs 23, that are interposed around the rods 20, between a seat 22, with which the brackets are provided, and a seat on said bar 21, or against the under side of the vehicle platform or floor. There is also provided a longitudinally-arranged frame 25, firmly bolted to the vehicle-body and extending downward under the seats 22 of the brackets 15, through which frame the ends of the rods 20 extend, their nuts bearing against it, affording a support for the lower ends of the said rods, and a stop limiting the downward movement of the brackets 15. The frame 25 is also divided longitudinally to provide a longitudinal recess 26 of sufficient width to permit the passage of the bracket 15, and the divided portions of the frame are curved upward upon opposite sides of the bracket, thus affording lateral support to the bracket and preventing any undue strain upon the rods 20. The pedestals 13, upon the same side of the vehicle, may be connected together, and thus suitably braced by a tie-rod 30, which may also be secured directly to the vehicle-body by one or more vertical rods 31.

Instead of permitting the lever-wheels E to run directly in contact with the main axle B, the latter may be provided with collars forming a bearing for said wheels, which collars may be removed and replaced by others, as may be necessary from time to time.

While the lever-wheels E are shown as secured to the ends of the axle D with brackets 15 and their brasses and rolls 18 located between the lever-wheels, it is obvious that the ends of the axle D may be extended beyond the lever-wheels, so that the brackets, their brasses, and rolls may be arranged outside the said wheels and between them and the track-wheels C, as is illustrated in Fig. 3. So, also, as seen in Fig. 4, the axle D may be divided, and the divided portions, each carrying a lever-wheel E, be supported upon one or opposite sides thereof by the said brackets 15 and the described connections.

The power of the driving-motor may be communicated to the lower or main axle B in any suitable means. A wheel F may be provided, (shown in dotted lines, Fig. 1, as secured to said axle,) through which the power may be transmitted to the track-wheels C.

What I claim is—

1. In anti-friction bearings, the combination, with a vehicle-body and its main axle and wheels, of the anti-friction axle and lever-wheels, a bracket in which the anti-friction axle is journaled, and a longitudinal frame rigidly attached to the vehicle-body and forming a lateral support for the bracket, substantially as described.

2. In anti-friction bearings, the combination of the anti-friction axle, a bracket in which the axle is journaled, and a pair of rolls carried by the bracket normally out of contact with the axle and adapted to contact and bear against the same as the position of the bracket changes with respect to the vertical, substantially as described.

3. In anti-friction bearings, the combination of the anti-friction axle, a bracket mounted so as to have vertical movement, and in which the axle is journaled, a longitudinal frame rigidly mounted, rods passing freely through holes in the bracket and secured to the said frame, and springs surrounding the rods and bearing against said bracket, substantially as described.

In testimony whereof I have signed my name to this specification in the presence of two subscribing witnesses.

WILLIAM JOHN BREWER.

Witnesses:
LOUIS WALSH,
JAMES L. MILNER.